US007136935B2

(12) United States Patent
Rao (10) Patent No.: US 7,136,935 B2
(45) Date of Patent: Nov. 14, 2006

(54) EFFICIENT DATA TRANSMISSIONS BASED ON A POLICY

(75) Inventor: Sriram Rao, Mountain View, CA (US)

(73) Assignee: Inktomi Corporation, Foster City, CA (US)

( * ) Notice: Subject to any disclaimer, the term of this patent is extended or adjusted under 35 U.S.C. 154(b) by 886 days.

(21) Appl. No.: 09/887,810

(22) Filed: Jun. 22, 2001

(65) Prior Publication Data

US 2003/0007488 A1    Jan. 9, 2003

(51) Int. Cl.
*G06F 15/16* (2006.01)

(52) U.S. Cl. .................. 709/250; 370/469; 370/389; 370/465; 370/467

(58) Field of Classification Search ........ 370/395–397, 370/229–230, 359, 389, 412–419, 392, 463, 370/465, 467, 469, 471, 428, 387; 709/250
See application file for complete search history.

(56) References Cited

U.S. PATENT DOCUMENTS

| 5,611,049 | A | | 3/1997 | Pitts ...................... 395/200.09 |
| 5,636,371 | A | | 6/1997 | Yu |
| 6,069,895 | A | * | 5/2000 | Ayandeh ...................... 370/399 |
| 6,085,234 | A | | 7/2000 | Pitts et al. ................... 709/217 |
| 6,108,713 | A | | 8/2000 | Sambamurthy et al. |
| 6,424,659 | B1 | * | 7/2002 | Viswanadham et al. .... 370/469 |
| 2001/0043614 | A1 | * | 11/2001 | Viswanadham et al. .... 370/469 |
| 2003/0152076 | A1 | * | 8/2003 | Lee et al. ................... 370/389 |
| 2003/0189936 | A1 | * | 10/2003 | Terrell et al. ........... 370/395.31 |

FOREIGN PATENT DOCUMENTS

WO    WO 00/30322    5/2000

OTHER PUBLICATIONS

Mustaque Ahamad, et al., "Multicast Communication in Unix 4.2BSD," Proceedings of the International Conference on Distributed Computing Systems, May 13-17, 1985, Silver Spring, IEEE Comp. Soc. Press US, , pp. 80-87, XP 000673844.

* cited by examiner

*Primary Examiner*—Ricky Q. Ngo
*Assistant Examiner*—Mark A. Mais
(74) *Attorney, Agent, or Firm*—Hickman Palermo Truong & Becker LLP; Christopher J. Brokaw (57) ABSTRACT

A method and apparatus for reducing performance overhead of a media server sending packetized audio/video data to an end-player or user is provided. The main sources of performance overhead associated with a media server transmitting packetized audio/video data are (1) copying data from the user space buffer to the kernel buffer and (2) context switching from user level to kernel level. There are several techniques that can be used to address overhead. One technique involves creating an aggregate packet, which includes a policy, at the user level and transmitting this aggregate packet from the user level to the OS level with a system call. A second technique involves manipulating packets based on a policy in the OS level rather than in the user level. The manipulation of packets may include redirecting packets or splitting packets.

28 Claims, 7 Drawing Sheets

EFFICIENT DATA TRANSMISSIONS BASED ON A POLICY

FIELD OF THE INVENTION

The present invention relates to efficient data transmission and more specifically to efficiently transmitting data by modifying the data at the OS level based on a policy.

BACKGROUND OF THE INVENTION

In recent years, the media industry has expanded its horizons beyond traditional analog technologies. Numerous systems have been developed for transmitting video information digitally from one location to be viewed at another location. One difficulty associated with providing video data in digital format is the performance-degrading overhead incurred when a media server sends packetized audio/video data to an end-player or user. Some of the main sources of overhead associated with a media server transmitting packetized audio/video data are (1) copying data from the user space buffer to the kernel buffer and (2) context switching from user level to kernel level.

The overhead involved in such transmissions may be even greater when one or more proxy servers are involved. A proxy server is an application that serves as a firewall by breaking the connection between the sender and the receiver of data. Data, which is received on one port, is forwarded on a different port, thus avoiding a straight path between two networks and preventing a hacker from obtaining internal addresses and details about a private network. Proxy servers are generally just one part of an overall firewall strategy to prevent intruders from stealing information or damaging an internal network.

Figure 1:
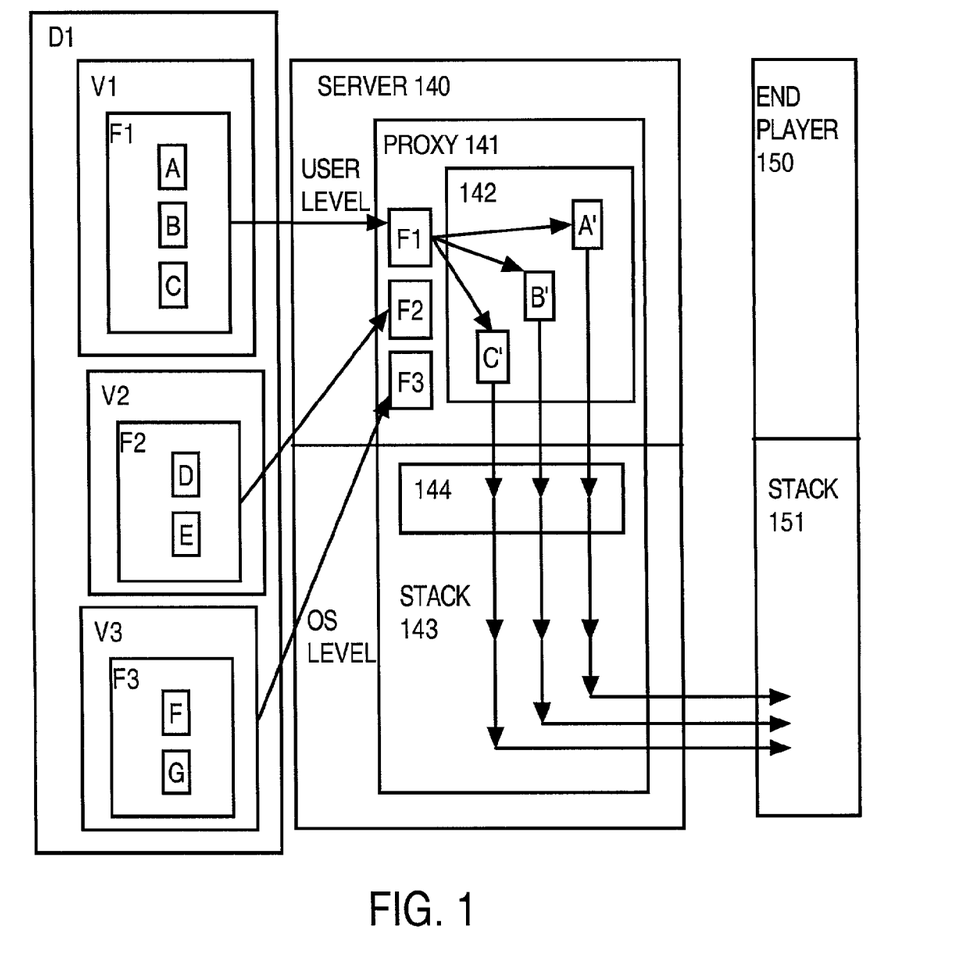
FIG. 1 is a block diagram illustrating the streaming of on-demand files without packet aggregation.

FIG. 1 depicts the streaming of data from on-demand files to an end-player. Three videos (V1, V2, V3) reside on disk D1, where each video is associated with a respective video file. Video V1 has file F1, Video V2 has file F2, and Video V3 has file F3. The files F1, F2, F3 contain data (A, B, C, D, E, F, G) that will eventually be transmitted in packets. Server 140 is divided into a user level and an OS level.

The files F1, F2, and F3 are transmitted from Disk D1 to the Proxy 141, which resides in the user level of Server 140. Upon receiving the files, Proxy 141 divides the files F1, F2, and F3 into packets. For the sake of brevity, FIG. 1 only depicts F1 being divided into packets. File F1 is divided into packets A', B', and C'. A', B', and C' are packets that contain the data represented by A, B, and C respectively.

Each layer of a network is associated with a protocol. Each protocol requires data to be packaged in a certain manner. The process of packaging data for the protocols used at the lower levels of the network is referred to as traversing down the network protocol stack. Conversely, the process of un-packaging data that is packaged at lower levels so that the data may be used at higher levels is referred to as traversing up the network protocol stack.

During the transmission process, the packets A', B', and C' are copied from User Buffer 142 to Kernel Buffer 144. Then packets A', B' and C' traverse down the protocol stack 143. Eventually the packets are transmitted over the network to an End Player 150 where the End Player 150 receives the packets. The packets then traverse up the protocol stack 151. FIG. 1 illustrates overhead both from copying data from the user space buffer to the kernel buffer and from context switching from user level to kernel level.

Figure 3:
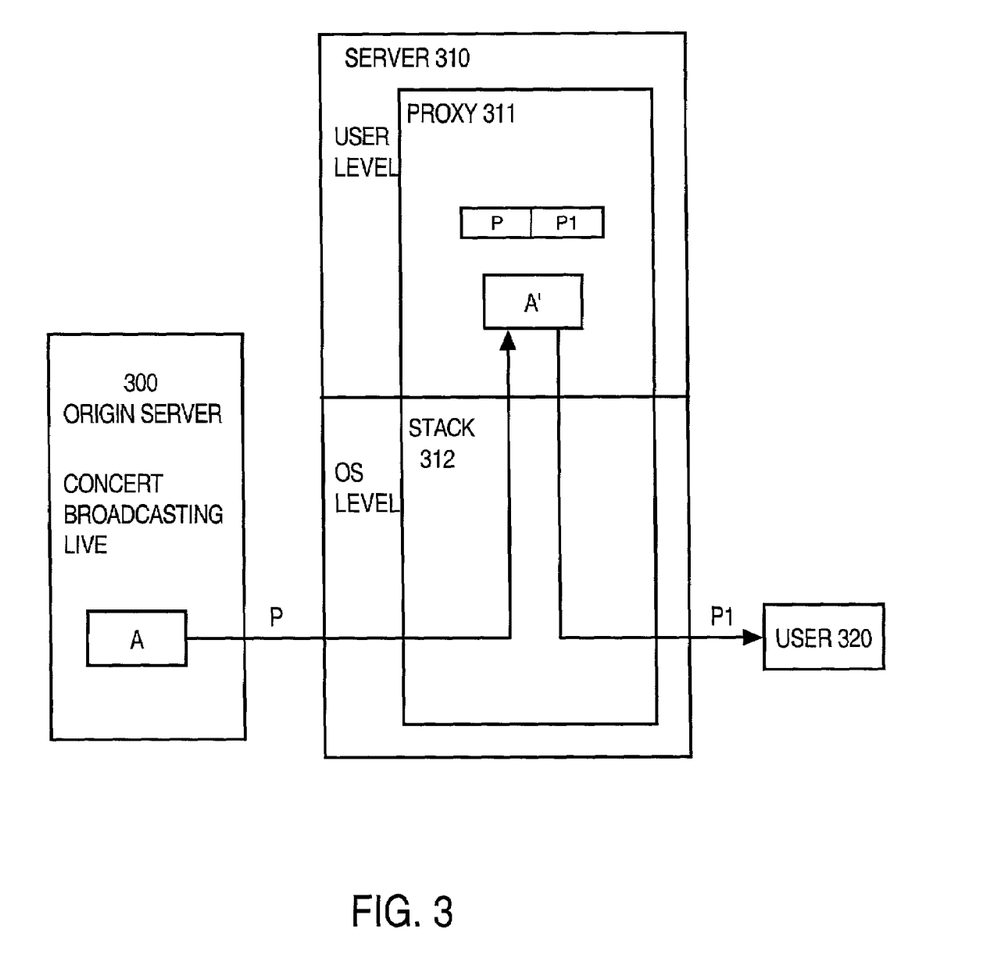
FIG. 3 is a block diagram illustrating the streaming of live content without pushing functionality down into the OS level.

FIG. 3 is similar to FIG. 1 except that FIG. 3 involves use of a proxy server 310. In FIG. 3, live content from an Origin Server 300 is sent to server 310. Server 310 includes a proxy 311 that modifies the header of a packet from the <IP address, Port number> pair of Server 310 to the <IP address, Port number> pair of User 320. The Origin Server 300 is broadcasting live. Origin Server 300 sends out packets to a Proxy 311 that resides on Server 310. For simplicity, the description will deal with only one packet called packet A. Origin Server 300 transmits packet A to the Proxy 311 using the <IP address, Port number> pair, which is designated with the letter P. Packet A is received on Server 310 at layer 1 of the OSI model and traverses up the protocol stack 312 from the OS level to the user level. Once packet A is in the Proxy 311, which resides in the user level of Server 310, packet header of A is modified so that the <IP address, Port number> pair designated by P is modified to the <IP address, Port number> pair P1. Packet A' represents the modified packet A. P1 is used for transmitting the packet A' from Server 310 to user 320. FIG. 3 illustrates overhead both from copying data from the user space buffer to the kernel buffer and from context switching from user level to kernel level.

Figure 5:
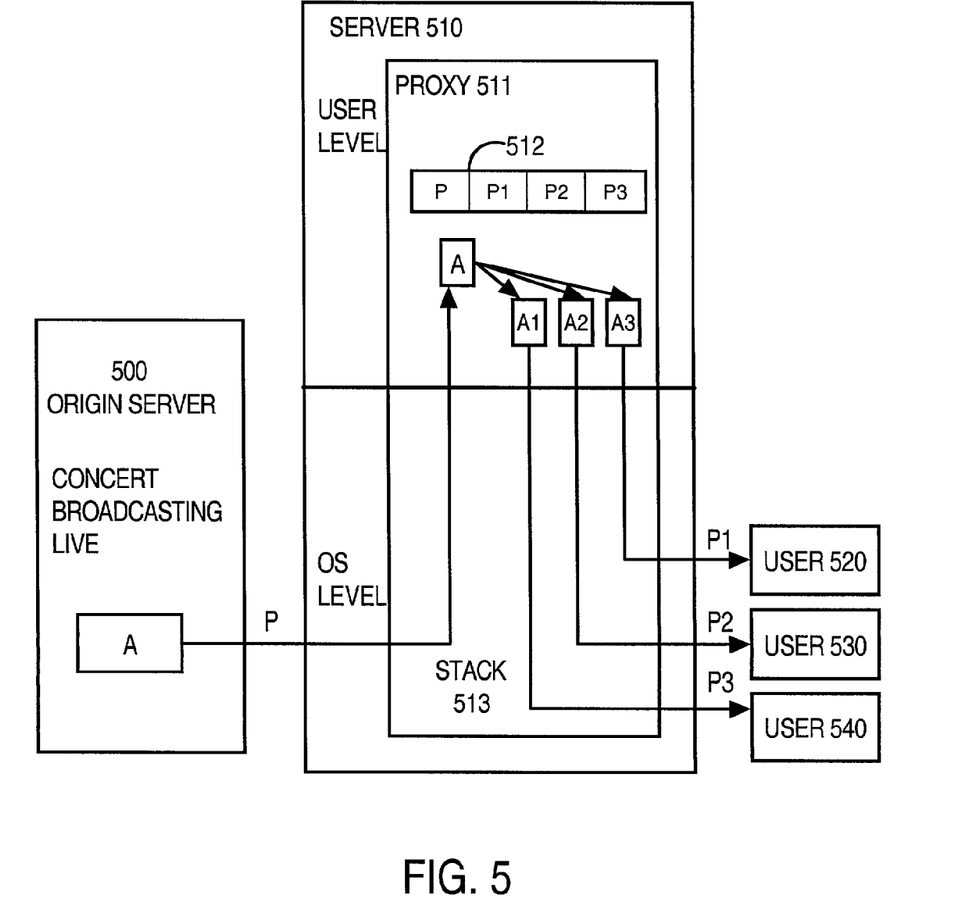
FIG. 5 is a block diagram illustrating streaming and splitting live content without pushing functionality down into the OS level.

FIG. 5 is similar to FIG. 3 except that FIG. 5 involves sending the same live content to multiple users. FIG. 5 depicts three users, user 520, user 530, and user 540, that will be receiving the live content from Origin Server 500.

In order to accomplish the goal of transmitting the same live content to multiple users, the Proxy 511, which resides at the user level of server 510, performs two tasks with regards to packet A once packet A arrives at Proxy 511. First, Proxy 511 replicates packet A so that there is a copy of packet A for each user that is interested in receiving the live data represented by packet A. Therefore, packet A is replicated into A1, A2, and A3. Second, the headers of packets A1, A2, and A3 are modified to contain new <IP address, Port number> pairs, which are used to transmit the replicated packets to the multiple users (520, 530, 540). The letter P represents the original <IP address, Port number> pair, which was used when packet A was transmitted by Origin Server 500 to Server 510. P1, P2, P3 represent the new <IP address, Port number> pairs. In other words P is changed to P1 in packet A1, P2 in packet A2, and P3 in packet A3.

In performing the modification of the packet headers, table 512 is used which maps P to P1, P2, and P3. For example, since P1 is used for transmitting A1 to User 520, A1's header will be modified to have P1. Likewise, since P2 is used for transmitting A2 to User 530 and P3 is used for transmitting A3 to user 540, A2's header will be modified to have P2 and A3's header will be modified to have P3.

After the replication of packet A and the modification of the headers of the replicated packets (A1, A2, A3), these replicated packets are transmitted to Users 520, 530, and 540. In transmitting the replicated packets, the replicated packets will traverse down the protocol stack 513 and are eventually sent out over the network to users 520, 530, 540. Since the headers of packets A1, A2, and A3 designate <IP addresses, Port number> pairs that correspond to the intended users, packet A1 will arrive at user 520, A2 will arrive at user 530, and A3 will arrive at user 540. FIG. 5 illustrates overhead both from copying data from the user space buffer to the kernel buffer and from context switching from user level to kernel level.

As with the scenario depicted in FIG. 1, the scenarios depicted in FIGS. 3 and 5 also involve copying data from the user buffer to the kernel buffer. However, aspects involved in copying data from user buffer to kernel buffer were left out of FIGS. 3 and 5 for the sake of brevity.

The three scenarios illustrated in FIGS. 1, 3 and 5 involve the two sources of overhead described above. Specifically, each packet is moved from user level to OS level by a user-level application making a call to an OS level routine, thereby causing one context switch per packet. Furthermore, when a proxy server is involved, transmitting the packets involves traversing up and down the protocol stack at the proxy server, in addition to the traversal down the stack that takes place at the origin server, and the traversal up the stack that takes place at the recipient. Based on the foregoing, it is desirable to provide techniques that reduce the overhead associated with transmitting data.

SUMMARY OF THE INVENTION

Techniques are provided for efficiently transmitting data by modifying packets at the OS level based on a policy. In so doing, techniques are provided for reducing the overhead incurred when a media server sends packetized audio/video data to an end-player or user. The main sources of performance overhead associated with a media server transmitting packetized audio/video data are (1) copying data from the user space buffer to the kernel buffer and (2) context switching from user level to kernel level. Several techniques are provided to address these areas of overhead. One technique involves, instead of making one system call for each packet, creating an aggregate packet at the user level that includes many packets. The aggregate packet is then transmitted from the user level to the OS level with a single system call, thereby reducing the number of context switches that must be performed.

A second technique involves pushing functionality from the proxy server, which resides in the user level, down into the OS level. The functions previously performed by the proxy server at the user level are performed at the OS level and involve modifying packets based on a policy, thereby eliminating the need to traverse the protocol stack at the proxy server. A third technique involves replicating a packet based on a policy at the OS level rather than at the user level.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

A method and apparatus for reducing the overhead associated with transmitting video/audio data from a proxy server to an end-player or user is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

As stated above, two main sources of overhead associated with a media server transmitting packetized audio/video data are (1) copying data from the user space buffer to the kernel buffer and (2) context switching from user level to kernel level. The movement of the packets from user level to OS level involves context switching. Several techniques are provided to reduce these areas of overhead. One technique involves creating, from a plurality of packets that would otherwise be sent individually to the operation system, an aggregate packet. The aggregate packet is then sent from the user level to the OS level with a single system call, thereby reducing context switching.

The technique of creating an aggregate packet significantly reduces overhead associated with context switching because the cost of writing the packets to the kernel buffer is amortized over a group of packets.

A second technique involves pushing functionality from the proxy server, which resides in the user level, down into the OS level, thereby reducing the amount of protocol stack traversals and eliminating both context switching and data copying. Furthermore, the functionality maybe pushed down into a piece of hardware, for example a router.

Aggregate Packets

One technique for reducing the overhead of context switching involves creating aggregate packets, which include several individual packets. For example, given the following individual packets, along with transmission sequence, designated end users, and the video that the packets belong to:

| Individual Packet Labels | Transmission sequence | Designated Users | Video |
|---|---|---|---|
| A | 3 | U2 | V2 |
| B | 1 | U2 | V2 |
| C | 5 | U2 | V2 |
| D | 4 | U1 | V1 |
| E | 2 | U1 | V1 |
| F | 6 | U1 | V1 |
| G | 7 | U1 | V1 |

An aggregate packet maybe created containing packets A, B, C, D, E, F, G, along with the sequence numbers of when the packets should be transmitted, the user that the video will be transmitted to and the video that the packets are a part of. The sequence numbers, designated users, and video-to-packet relationship are examples of policies for manipulating data/packets.

Although existing operating systems provide mechanisms for packet aggregation, the policy that existing operating systems impose is restrictive. The aggregated packets are all sent to the same destination in a synchronous manner. In other words, when the application aggregates packets and sends the packets to the kernel, the packets are transmitted immediately to a single destination.

In contrast, a technique is provided for extending the concept of packet aggregation. For example, the aggregate may belong to different destinations and define a policy for sending out the aggregated packets. The policy could be time stamps, sequence numbers, etc. In this example, sequence numbers are used for determining when to send out the packets. However, there are other mechanisms for determining when to send out packets, which will be discussed under Transmission Timestamps.

Transmission Timestamps

One technique used for determining when to transmit individual packets contained in an aggregate packet is to use transmission timestamps. Transmission timestamps are virtual times of when packets are to be transmitted from the server/proxy to the end players. In the case where data will be streamed from on-demand files, the transmission timestamps are known a-priori. There are several techniques for implementing transmission timestamps. One technique is to have the transmission timestamps be sequence numbers of when the packets should be transmitted with respect to each other. For example, the first packet would have a timestamp of zero, the second packet a timestamp of one, the third packet a timestamp of two, etc. A second technique of implementing timestamps is to use actual time delays, for example in milliseconds, with respect to each other of when the packets are to be transmitted. For example, the first packet would have a time stamp of T0 since it is virtual time zero, a second packet would have a time stamp of T3 since the second packet would be transmitted 3 milliseconds after the first packet, a third packet would have a timestamp of T7 since the third packet would be transmitted 7 milliseconds after the first packet and so on.

A third technique involves assigning a relative range time stamp to an aggregate of packets. In the previous example discussed under section "Aggregate Packets" the aggregate packet that contained packets A–G, the relative range timestamp would be 1 to 7.

Packet Aggregation Example

Figure 2:
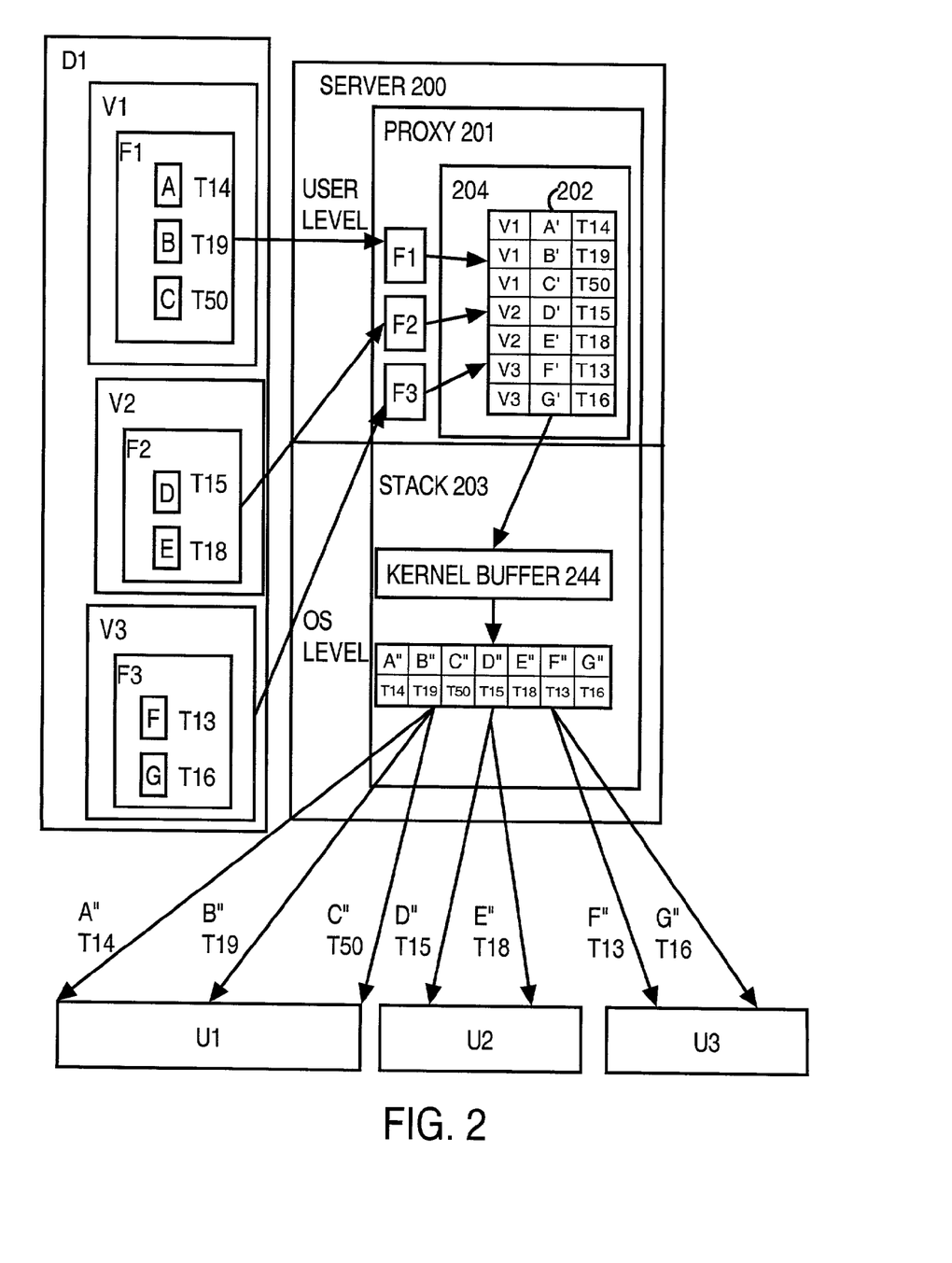
FIG. 2 is a block diagram illustrating the streaming of on-demand files with packet aggregation.

FIG. 2 depicts the streaming of data from on-demand files to multiple users using packet aggregation according to one embodiment of the invention. There are three videos (V1, V2, V3) on disk D1 and each video is associated with a respective file. Video V1 has file F1, Video V2 has file F2, and Video V3 has file F3. Although FIG. 2 only shows one file per video, there may be multiple files per video.

The files F1, F2, F3 contain data (A, B, C, D, E, F, G) that will eventually be packaged into packets and transmitted according to the transmission times associated with them. Server 200 is divided into a user level and an OS level. The files F1, F2, and F3 are read from Disk D1 by the Proxy 201, which resides in the user level of Server 200. The Proxy 201 divides the files F1, F2, and F3 into packets. File F1 is divided into packets A', B', and C'. File F2 is divided into packets D' and E'. File F3 is divided into packets F' and G'. A', B', C', D', E' and F' are packets that contain the data represented by A, B, C, D, E, and F, respectively.

The individual packets A', B', C', D', E', F', and G' are aggregated into an aggregate packet 202 in Proxy 201, which is at the user level. This aggregate packet not only contains the individual packets but may also indicate the video that each individual packet is associated with, and the transmission times at which the packets will need to be transmitted. The aggregate packet 202 has a relative range timestamp of T13 to T50 where T13 is the lowest timestamp and T15 is the highest timestamp of the individual packets that comprise the aggregate packet 202.

The aggregate packet 202 is copied into the Kernel Buffer 244, which resides at the OS level of Server 200. The aggregate packet 202, which has been copied to the Kernel Buffer 244, is re-packaged into individual packets which are represented by A", B", C", D", E", F", and G". The packets still require a certain amount of traversing the protocol stack 203. The packets are transmitted over the network to the users (U1, U2, and U3) according to the transmission times associated with each of the packets. In other words, the packets are transmitted in the following order to the designated users:

| Packet Label | Transmission Time | Designated Users |
| --- | --- | --- |
| F" | T13 | U3 |
| A" | T14 | U1 |
| D" | T15 | U2 |
| G" | T16 | U3 |
| E" | T18 | U2 |
| B" | T19 | U1 |
| C" | T50 | U1 |

To summarize, creating an aggregate packet 202 and copying that aggregate packet from the user buffer 204 to the Kernel Buffer 244 with a system call reduces the number of context switches. However, this technique does not eliminate the need for copying data nor does this technique eliminate the need for packets traversing the protocol stack 203.

Os-Level Packet Redirection

One technique for reducing the overhead involved in transmitting data involves the elimination of copying data from the user buffer to the kernel buffer and context switching. Typically in broadcasting live (as depicted in FIG. 3), packets when received by a server traverse up a protocol stack, from layer 1 of the OSI model to the application layer, and back down the protocol stack before redirecting the packets to a user. One technique for reducing the overhead of copying data and context switching is to move the functionality of redirecting packets down into the OS level and thereby eliminating the copying of data and context switching.

Example of Redirecting Packets at the Os-Level

Figure 4:
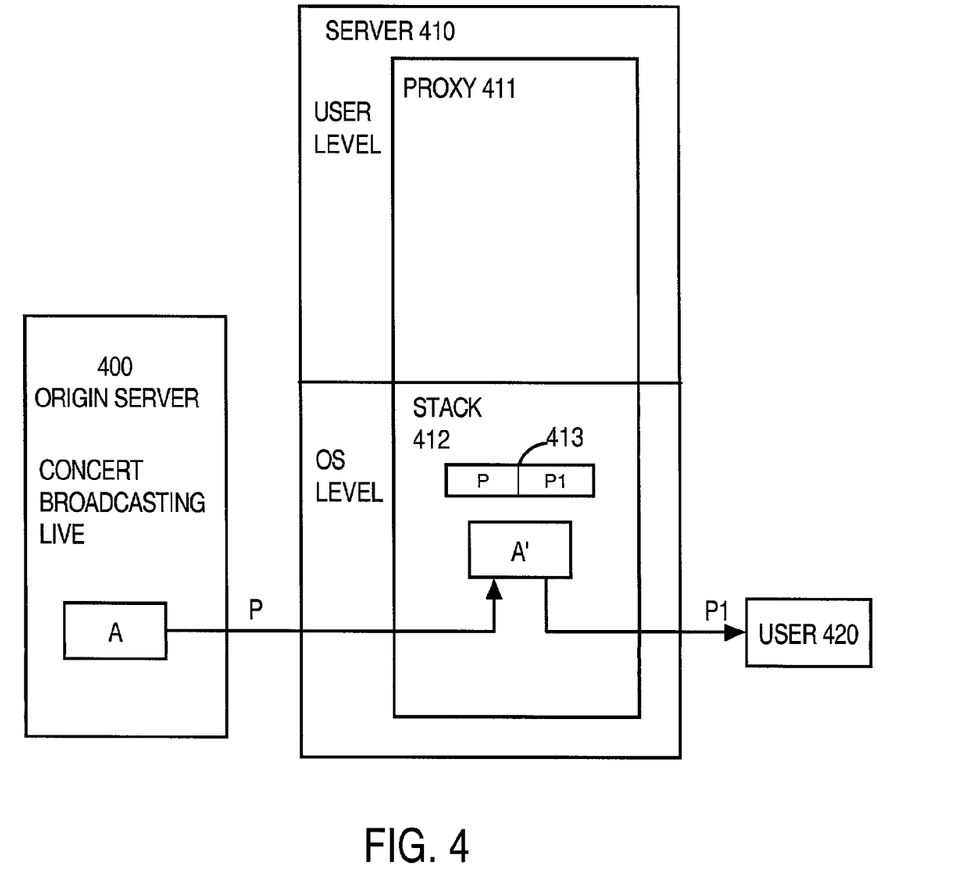
FIG. 4 is a block diagram illustrating the streaming of live content with pushing functionality down into the OS level.

FIG. 4 is an example of moving the functionality for redirecting packets based on a policy down into the OS level and thereby eliminating the copying of data and context switching. A policy is used to determine how to redirect the packets to an end user. More specifically, FIG. 4 involves streaming of live content from an Origin Server and modifying the header of a packet from the <IP address, Port number> pair of Server 410 to the <IP address, Port number> pair of User 420, where the modification takes place at the OS level according to an embodiment of the invention. In the scenario depicted in FIG. 4, the Origin Server 400 is broadcasting live. The responsibility for redirecting the packets has been pushed down the protocol stack 412 to the OS level of Server 410.

According to one embodiment, Origin Server 400 sends out packets to a Proxy 411 that resides on Server 410. For simplicity, it shall be assumed that Origin Server 400 sends only one packet, called packet A. Origin Server 400 transmits packet A to the Proxy 411 using the <IP address, Port number> pair designated by letter P. Packet A is received on Server 410 at layer 1 of the OSI model and, using conventional techniques, would traverse up the protocol stack 412 from the OS level to the user level.

However, instead of sending packet A to the Proxy 411 at user level, packet A remains at the OS level of the protocol stack 412, thus avoiding context switching and reducing traversals of the protocol stack 412. Furthermore, for reflection, packets can be replicated without incurring any copying overheads because operating systems provide mechanisms for sharing (i.e., for replication) in the operating system level of protocol stack without data copying. At the OS level table 413 (i.e., a policy) is used to modify packet A so that P in the header is modified to P1 where P1 is the <IP address, Port number> pair used to transmit data to User 420. Packet A' represents the modified packet A. Packet A' is then sent out from the server 410 to the intended recipient without having traversed up to the user level of protocol stack 412, and without having caused a context switch to an application at the user level. Table 413 is just one example of the kind of policy that may be used for modifying packets.

To summarize, moving functionality from the user level down into the OS level eliminates both context switching and copying of data from the user buffer to the kernel buffer. It also reduces the amount of protocol stack traversal that is required to transmit the data.

Os-Level Packet Splitting

In the event that there is a need to transmit the same video to several interested parties, packet splitting may be used. Typically, packet splitting is performed at the application level thus incurring the overhead of copying data and context switching as depicted in FIG. 5. One technique for reducing the overhead of copying data and context switching is to move the functionality of packet splitting down into the OS level and thereby eliminating the copying of data and context switching.

Example of Os-Level Packet Splitting

Figure 6:
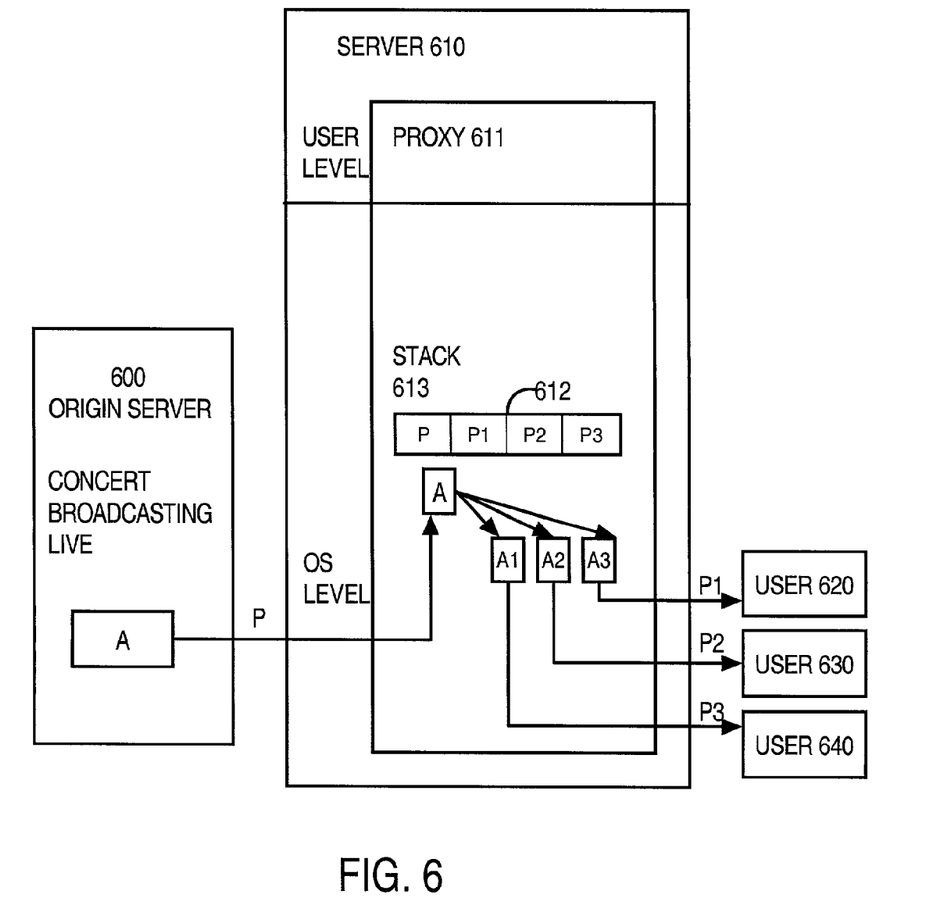
FIG. 6 is a block diagram illustrating streaming and splitting live content with pushing functionality down into the OS level.

FIG. 6 is an example of moving the functionality for splitting packets based on a policy down into the OS level and thereby eliminating the copying of data and context switching. A policy is used to determine how to split the packets. More specifically, FIG. 6 involves sending the same live content to multiple users. The Origin Server 600 is broadcasting live. Packet manipulation is pushed down the protocol stack 613 to the OS level of Server 610.

The scenario depicted in FIG. 6 shows three users (620, 630, 640) that will be receiving the live content. Once the data arrives at Server 610, the data no longer traverses the stack 613 all the way up to the Proxy 611 in the user level. Instead the functionality that would have been in Proxy 611 is pushed down into the protocol stack 613.

The functionality that is pushed down into the OS level of server 510 encompasses two things: the ability to replicate packets, and the ability to redirect packets. In the present example, packet A is replicated so that there is a copy of packet A for each user that is interested in receiving the live data. Therefore, packet A is replicated into A1, A2, and A3. Next, the headers of packets A1, A2, and A3 are modified to have new <IP address, Port numbers> pairs. In other words, P in packet A is the <IP address, Port number> that was used for transmitting packet A from Origin Server 600 to Server 610. P is replaced with P1, P2, P3 where P1, P2, and P3 are new <IP address, Port number> pairs that will be used to transmit the replicated packets to their intended users.

In performing the modification of the packet headers, table 612 is used to map P to P1, P2, and P3. Table 612 may be built at the OS level based on calls made by an application at the user level. Specifically, the user-level application sends information to the OS to inform the OS of the redirection/replication needs of the user-level application. In response to the information, the OS builds table 612. When packets arrives at the OS level, the OS consults table 612 to determine how to handle the packets. Table 612 is just one example of how a policy may be implemented.

For example, since P1 is used for transmitting A1 to User 620, A1's header will be modified to have P1. Likewise, since P2 is used for transmitting A2 to User 630 and P3 is used for transmitting A3 to user 640, A2's header will be modified to have P2 and A3's header will be modified to have P3.

After the replication of packet A and the modification of the headers of the replicated packets (A1, A2, and A3) these replicated packets are transmitted to Users 620, 630, and 640. No copying is incurred. Furthermore, for reflection, packets can be replicated without incurring any copying overheads because operating systems provide mechanisms for sharing (i.e., for replication) in the operating system level of protocol stack without data copying. In transmitting the replicated packets (A1, A2, and A3), the replicated packets will traverse down the protocol stack 613 and are eventually sent out over the network to users 620, 630, and 640. Since packets A1, A2, and A3 have <IP address, Port Number> pairs that correspond to the intended users, packet A1 will arrive at user 620, A2 will arrive at user 630, and A3 will arrive at user 640.

To summarize, pushing functionality from the user level down into the OS level eliminates both context switching and copying of data from the user buffer to the kernel buffer. It also reduces the amount of protocol stack traversal that is required to transmit the data.

Level of Packet Redirection and Splitting

In the foregoing examples, the functions of redirecting packets and splitting packets were performed at an OS level of the protocol stack. The specific level at which these operations are performed may vary from implementation to implementation based on a variety of factors, while still achieving the reduction in context switching and protocol stack traversals.

Where in the protocol stack these operations are performed depends on, among other things, which protocol is being used by the particular video application. For example, if UDP is the transport protocol, then the operations may be performed below the IP stack. Performing the operations below the IP stack avoids traversing the IP protocol stack multiple times. For UDP, the solution would be implemented in the UDP stack by building a "custom" UCP stack in which the solution can be implemented in the kernel itself.

On the other hand, if TCP is the transport protocol, then it may be necessary to perform the operations above the TCP stack. Therefore, the data packets may need to traverse the IP protocol stack multiple times. In the case of TCP, the amount of traversal would still be reduced. For TCP, the solution would be implemented in the TCP stack by building a "custom" TCP stack in which the solution can be implemented in the kernel itself. The "last layer" of the TCP stack would do the reflection in the kernel.

Functionality in Hardware

Not only can the functionality of manipulating packets based on a policy be performed at the OS level instead of at the user level, but the functionality maybe performed on a piece of hardware such as a router. By moving the functionality of manipulating packets based on a policy to hardware, further reductions in overhead would be realized. As stated before, examples of manipulating packets include but are not limited to aggregating packets, redirecting packets, and splitting packets. Examples of policies include but are not limited to information for packet-to-video relationship, destination, timestamps, video-to-user relationships, etc.

Hardware Overview

Figure 7:
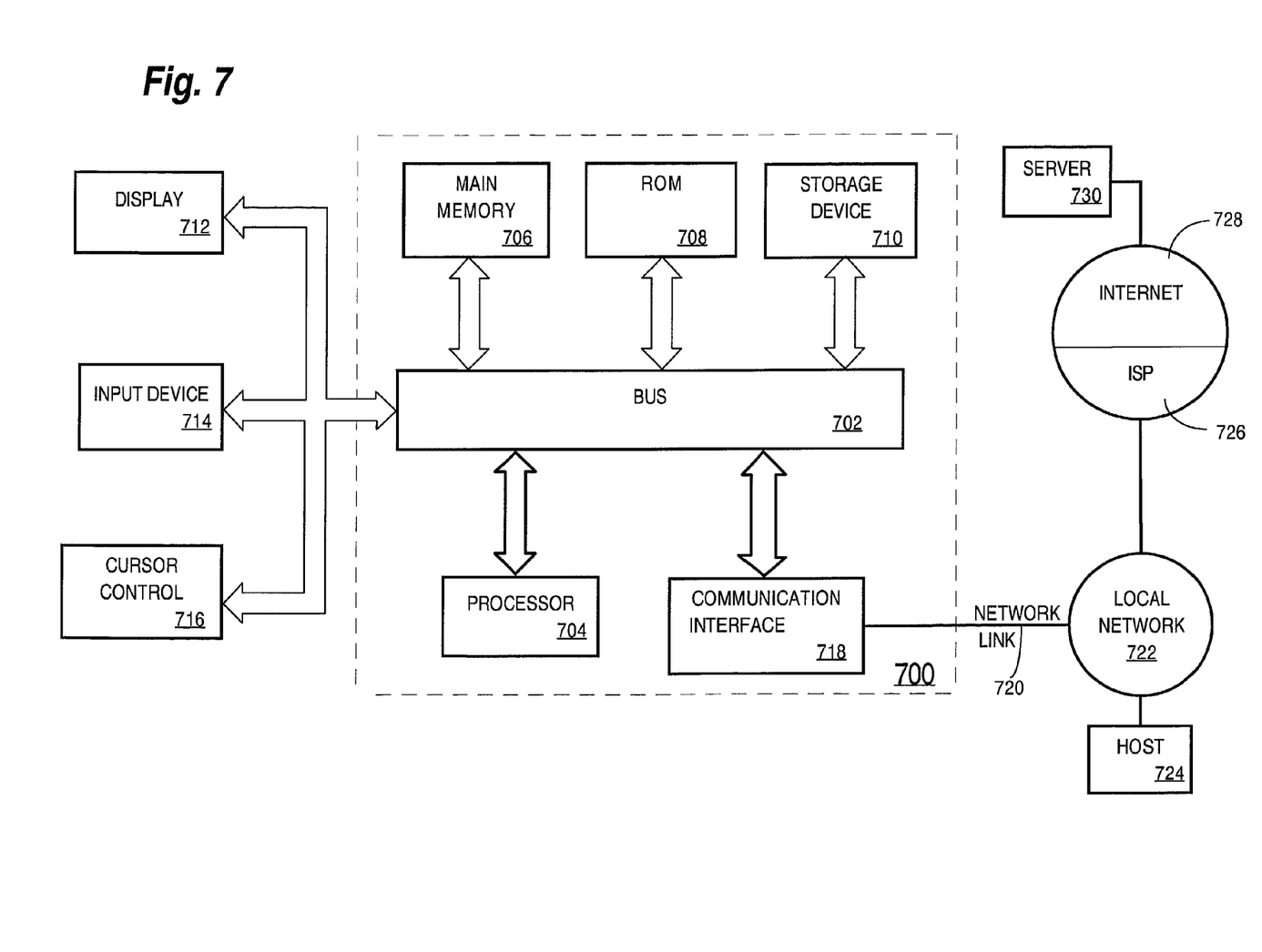
FIG. 7 is a computer system on which an embodiment of the invention may be implemented.

FIG. 7 is a block diagram that illustrates a computer system 700 upon which an embodiment of the invention may be implemented. Computer system 700 includes a bus 702 or other communication mechanism for communicating information, and a processor 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

The invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another computer-readable medium, such as storage device 710. Execution of the sequences of instructions contained in main memory 706 causes processor 704 to perform the process steps described herein. In alternative embodiments, hardwired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718. In accordance with the invention, one such downloaded application provides for a video communication system as described herein.

The received code may be executed by processor 704 as it is received, and/or stored in storage device 710, or other non-volatile storage for later execution. In this manner, computer system 700 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A computer-implementable method for having computer executable instructions on a computer readable medium for sending packets, comprising the steps of:

communicating, from an application to an operating system, a policy for manipulating packets, wherein the policy specifies at least one of (a) redirection needs of the application, (b) replication needs of the application, (c) packet aggregating needs of the application, and (d) packet splitting needs of the application; and in response to receiving packets at the operating system, the operating system modifying the packets based on a policy without intervention of the application.

2. The method of claim 1, wherein the step of communicating the policy comprises:

at the operating system, in response to receiving the policy from the application, storing the policy in a data structure.

3. The method of claim 1, wherein the policy indicates destinations to which messages should be redirected.

4. The method of claim 1, wherein:

the step of modifying the packets includes receiving a packet, replicating the packet based on the policy to create a plurality of replicated packets for a plurality of users interested in receiving the packet; and the method further comprises the step of transmitting the replicated packets to the interested users based on the policy.

5. The method of claim 1, wherein the policy is a first policy, wherein the packets are a first set of packets, and the method further comprises the steps of:

communicating, from the application to the operating system, a second policy for manipulating packets; and at the operating system, modifying a second set of packets based on the second policy while the operating system is still configured to modify the first set of packets based on the first policy.

6. A computer-implementable method for having computer executable instructions on a computer readable medium for sending messages, comprising the steps of:

creating, by an application, an aggregate message from individual messages that are to be sent using an operating system service;

transmitting the aggregate message from the application to an operating system with a system call;

within the operating system, dividing the aggregate message back into individual messages; and transmitting the individual messages using the operating system service, wherein at least one of the individual messages is sent to a different recipient than another of the individual messages.

7. The method of claim 6, wherein the individual messages are packets.

8. The method of claim 6, wherein the aggregate message includes a policy.

9. The method of claim 8, wherein the policy indicates destinations to which messages should be redirected.

10. The method of claim 8, wherein the policy includes video-to-message information.

11. The method of claim 8, wherein the policy includes a time stamp that is a range of time indicating when the individual messages should be transmitted.

12. The method of claim 8, wherein the policy includes time stamps for transmitting the individual messages according to the time stamps associated with the individual messages.

13. The method of claim 12, wherein the time stamps are sequence numbers.

14. The method of claim 12, wherein the time stamps are relative virtual time delays with respect to the first message to be transmitted.

15. A computer-readable medium carrying one or more sequences of computer instructions for sending packets, wherein the execution of one or more sequences of computer instructions by one or more processors causes the one or more processors to perform the steps of:

communicating, from an application to an operating system, a policy for manipulating packets, wherein the policy specifies at least one of (a) redirection needs of the application, (b) replication needs of the application, (c) packet aggregating needs of the application, and (d) packet splitting needs of the application; and in response to receiving packets at the operating system, the operating system modifying the packets based on a policy without intervention of the application.

16. The computer-readable medium of claim 15, wherein the step of communicating the policy comprises:

at the operating system, in response to receiving the policy from the application, storing the policy in a data structure.

17. The computer-readable medium of claim 15, wherein the policy indicates destinations to which certain messages should be redirected.

18. The computer-readable medium of claim 15, wherein the policy is a first policy, wherein the packets are a first set of packets, and wherein execution of the one or more sequences of instructions by the one or more processors further causes the one or more processors to perform the steps of:

communicating, from the application to the operating system, a second policy for manipulating packets; and at the operating system, modifying a second set of packets based on the second policy while the operating system is still configured to modify the first set of packets based on the first policy.

19. The computer-readable medium of claim 15, wherein:

the step of modifying the packets includes receiving a packet, replicating the packet based on the policy to create a plurality of replicated packets for a plurality of users interested in receiving the packet; and the method further comprises the step of transmitting the replicated packets to the interested users based on the policy.

20. A computer-readable medium carrying one or more sequences of computer instructions for sending packets, wherein the execution of one or more sequences of computer instructions by one or more processors causes the one or more processors to perform the steps of:
    creating, by an application, an aggregate message from individual messages that are to be sent using an operating system service;
    transmitting the aggregate message from the application to an operating system with a system call;
    within the operating system, dividing the aggregate message back into individual messages; and
    transmitting the individual messages using the operating system service, wherein at least one of the individual messages is sent to a different recipient than another of the individual messages.

21. The computer-readable medium of claim 20, wherein the individual messages are packets.

22. The computer-readable medium of claim 20, wherein the aggregate message includes a policy.

23. The computer-readable medium of claim 21, wherein the policy indicates destinations to which messages should be redirected.

24. The computer-readable medium of claim 22, wherein the policy includes video-to-message information.

25. The computer-readable medium of claim 22, wherein the policy includes a time stamp that is a range of time indicating when the individual messages should be transmitted.

26. The computer-readable medium of claim 22, wherein the policy includes time stamps for transmitting the individual messages according to the time stamps associated with the individual messages.

27. The computer-readable medium of claim 26, wherein the time stamps are sequence numbers.

28. The computer-readable medium of claim 26, wherein the time stamps are relative virtual time delays with respect to the first message to be transmitted.

* * * * *